(12) United States Patent
Deegan

(10) Patent No.: US 8,686,680 B2
(45) Date of Patent: Apr. 1, 2014

(54) DUAL-MOTOR SERIES ELASTIC ACTUATOR

(75) Inventor: Patrick Deegan, Somerville, MA (US)

(73) Assignee: Rethink Robotics, Inc., Boston, MA (US)

( * ) Notice: Subject to any disclaimer, the term of this patent is extended or adjusted under 35 U.S.C. 154(b) by 294 days.

(21) Appl. No.: 13/159,047

(22) Filed: Jun. 13, 2011

(65) Prior Publication Data
US 2012/0312114 A1 Dec. 13, 2012

(51) Int. Cl.
*B25J 5/00* (2006.01)

(52) U.S. Cl.
USPC ...... 318/568.12; 318/560; 318/561; 318/509; 318/625; 160/313; 160/170; 414/735; 414/738

(58) Field of Classification Search
USPC .................. 318/568.12, 560, 561, 609, 625; 160/313, 170; 414/735, 738
See application file for complete search history.

(56) References Cited

U.S. PATENT DOCUMENTS

| | | | |
|---|---|---|---|
| 3,665,482 A | 5/1972 | Cresswell | |
| 4,189,951 A | 2/1980 | Sauter | |
| 4,528,862 A | 7/1985 | Goldowsky | |
| 4,550,626 A | 11/1985 | Brouwer | |
| 4,714,388 A | 12/1987 | Siler | |
| 4,729,258 A * | 3/1988 | Mohri et al. | 475/5 |
| 4,739,670 A | 4/1988 | Tomita et al. | |
| 4,804,304 A * | 2/1989 | Tellden | 414/735 |
| 4,828,453 A * | 5/1989 | Martin et al. | 414/738 |
| 5,083,896 A * | 1/1992 | Uehara et al. | 414/744.5 |
| 5,138,904 A * | 8/1992 | Lande et al. | 74/661 |
| 5,517,874 A | 5/1996 | Janiszewski | |
| 5,584,647 A * | 12/1996 | Uehara et al. | 414/744.5 |
| 5,650,704 A | 7/1997 | Pratt et al. | |
| 5,910,720 A | 6/1999 | Williamson et al. | |
| 6,148,684 A | 11/2000 | Gardiner | |
| 6,258,002 B1 | 7/2001 | Lippitsch | |
| 6,536,503 B1 * | 3/2003 | Anderson et al. | 160/170 |
| 6,968,884 B2 * | 11/2005 | Anderson et al. | 160/170 |
| 6,997,076 B2 | 2/2006 | Menjak et al. | |
| 7,086,302 B2 | 8/2006 | Ask et al. | |
| 7,088,012 B2 | 8/2006 | Gizara | |
| 7,121,973 B2 | 10/2006 | Lumpkin et al. | |
| 7,191,675 B2 | 3/2007 | Ho | |

(Continued)

FOREIGN PATENT DOCUMENTS

| | | |
|---|---|---|
| EP | 0355083 | 2/1990 |
| EP | 0505140 | 9/1992 |
| JP | 60040866 | 3/1985 |
| WO | WO-2008/142131 | 11/2008 |

OTHER PUBLICATIONS

Robertez et al., "Precise Robot Motions Using Dual Motor Control," IEEE International Conference on Robotics and Automation Anchorage Convention District, pp. 5613-5620 (2010).

*Primary Examiner* — Paul Ip
(74) *Attorney, Agent, or Firm* — Bingham McCutchen LLP

(57) ABSTRACT

Certain embodiments of a system for reducing backlash include a member geared for rotation in first and second directions. In various implementations, a first motor causes rotation in the first direction with an output biased to preclude space between mating gear components in the first direction, and a second motor, which is mechanically independent of the first motor, causes rotation in the second direction with an output biased to preclude space between mating gear components in the second direction.

16 Claims, 9 Drawing Sheets

(56) References Cited

U.S. PATENT DOCUMENTS

| | | |
|---|---|---|
| 7,261,667 B2 | 8/2007 | Berger |
| 7,311,133 B2 * | 12/2007 | Anderson et al. ............. 160/170 |
| 7,605,488 B2 | 10/2009 | Rebsdorf |
| 7,673,536 B2 * | 3/2010 | Tamura et al. ............. 74/490.01 |
| 7,802,608 B2 * | 9/2010 | Anderson et al. ............. 160/170 |
| 2002/0121152 A1 | 9/2002 | White et al. |
| 2003/0015051 A1 | 1/2003 | Nomura et al. |
| 2004/0089089 A1 | 5/2004 | Stevens et al. |
| 2005/0005725 A1 * | 1/2005 | Chang et al. ............... 74/490.06 |
| 2007/0295136 A1 | 12/2007 | Fleming |
| 2008/0056858 A1 * | 3/2008 | Tamura et al. ........... 414/222.01 |
| 2009/0314114 A1 | 12/2009 | Grosberg |
| 2010/0181955 A1 * | 7/2010 | Maeda et al. ................. 318/625 |
| 2010/0231158 A1 * | 9/2010 | Jonsson ....................... 318/609 |
| 2011/0000628 A1 * | 1/2011 | Anderson et al. ............. 160/313 |

* cited by examiner

DUAL-MOTOR SERIES ELASTIC ACTUATOR

BACKGROUND

System components such as mechanical couplings, sensors, and actuators often require precision for applications in which the performance of feedback control systems is critical. For instance, precise control of an electro-mechanical system such as a robot is important for many applications in industrial automation, consumer products, and logistics and supply chain operations. A common mechanical coupling in robotics utilizes gear couplings or gearboxes. Gearboxes can be particularly useful because electromagnetic transducers can deliver very low torques at very high speeds. In applications, such as robotics, where bidirectional actuation with a gear reduction, a hydraulic servo valve, or a piezoelectric transducer, for instance, is often necessary, backlash, dead-zone, and hysteresis can severely limit the performance of feedback control systems.

Backlash in a gearbox is the amount of space between mating components of gears. By design, this space is built in to account for, inter alia, imprecision in gear manufacture and thermal expansion. In applications in which the gear couplings can be reversed, such as robotics, backlash of the mating components of the gears negatively affects the ability of the gears to translate input motion into instantaneous output motion. Moreover, this hard non-linearity prevents accurate positioning and may lead to chattering and limit-cycle type instabilities. This increases the wear and tear on gears, which, in turn, further increases backlash.

Dead-zone is a type of non-linearity in which the system does not respond with an output until the input reaches a certain level. Sometimes this type of non-linearity is intentional. For instance, systems may incorporate a small dead-zone to prevent constant operation and thus reduce wear and tear around a nominal operating point. Dead-zone is distinct from backlash and hysteresis in the sense that it does not have memory of previous operating conditions.

Backlash is a form of mechanical hysteresis due to space between mating components in a transmission, i.e., the "play" between parts. More generally, hysteresis indicates a state dependency on the history of the state of the system. An example of a system that demonstrates hysteresis is a spring that undergoes both elastic and plastic deformation. When compressed, due to the plastic deformation, the rest position of the spring will change depending on how far the spring was compressed. Thus, the state of the spring (rest position) depends on the history of the system.

In standard gear trains, backlash is inevitable due to the over-constrained nature of gears. Care can be taken to significantly reduce backlash by tight tolerancing, but at significant cost. Other solutions to backlash have been developed. In one approach, harmonic drive gearboxes have zero backlash, but suffer from high flexibility, resonance vibration, friction and structural damping nonlinearities, and are typically proprietary and expensive. In another approach, cycloidal gearboxes are another style of gearbox which remove backlash, and while they do not share the same durability issues as harmonic drives, they still tend to be proprietary and expensive.

In another approach, anti-backlash gears are used. In application, an anti-backlash gear mates with a standard gear. A typical arrangement consists of two concentric gears, with one gear rigidly held to the shaft and the other gear coupled through a spring with a set pre-tension. The gear teeth of both anti-backlash gears sandwich the standard gear, and depending on the direction of force, independently act as the load path of the gear train. Thus, as long as the pre-tension is not overcome, the anti-backlash gear effectively captures and tracks the previous gear in the gear train, and there is no backlash. When the pre-load is overcome, however, the position of the anti-backlash gear becomes a function of the loading, the spring constant, and the pre-load, which has been viewed as an undesirable behavior.

In still another approach, dual actuators are used. In a typical configuration, two or more drives are utilized in parallel connection to the final output stage. Backlash is reduced by small positional differences in the drive, effectively replicating the effect of anti-backlash gears. Active control and synchronization is generally required between the drives, however, to manage positional differences and prevent large undesirable torques.

Some applications can tolerate a compliant drive, and may—as in the case of series elastic actuators—even require it. A typical approach in such applications is to find a gearbox with an appropriate level of backlash and an independent compliant system, and combine them. Although the gearboxes are chosen based on their relationship between input motion and output motion, the whole system behaves with an input motion and an output force or torque.

Furthermore, techniques exist for computationally addressing system non-linearities such as backlash, hysteresis, and dead-zones. These approaches include implementing inverses of the non-linearities in the controllers or implementing adaptive, fuzzy, or neural network control techniques. However, in most cases the parameters of the non-linearities are unknown, and more generally, these techniques can be complicated and may not provide robust performance over a wide range of plant or environmental conditions.

What is needed, then, is a system for reducing or minimizing backlash, hysteresis, and dead-zones that is uncomplicated, cost-effective, and durable.

SUMMARY OF THE INVENTION

Generally, the invention relates to utilizing elastic elements in series with two parallel motor outputs to antagonistically bias their corresponding mechanical couplings so as to mitigate the negative effects of backlash, hysteresis, and dead-zone on closed loop control of the system. The motor outputs can be separated and biased in opposite directions by independently controlling the output torque of respective motors, such that gearboxes between the motor outputs and the motors are not in a backlash region. This utilization of two series elastic actuators in parallel for each joint can eliminate backlash by creating an opposing torque which pre-loads each gearbox, so that for either direction of output, at least one gearbox is in mesh. As the elastic elements are passive, they require torque feedback and an effective control system to generate torque offset. Some embodiments of the invention include modifying the feedback to the elastic actuators in response to changes in control references (e.g., computation) or environmental conditions (e.g., disturbances) by altering the transfer function of the torque controllers. The torque bias can be a function of system variables and the torque-offset profile can take many shapes. The invention thus includes switching between torque profiles in response to environmental context or control references to help mitigate backlash and maintain efficiency of the system.

In general, in one aspect, embodiments of the invention feature a system for reducing backlash in an apparatus with a single output member geared for rotation in first and second opposite directions. The system includes a first motor for causing rotation in the first direction with an output biased to preclude space between mating gear components in the first direction, and a second motor, which due to the compliant mechanical coupling between motors allows it to be controlled without state feedback from the first motor, for causing rotation in the second direction with an output biased to preclude space between mating gear components in the second direction.

In one embodiment, the output of the first motor is biased by a first intermediate mechanical component in series with the first motor output and includes a first torque-biasing elastic element, and the output of the second motor is biased by a second intermediate mechanical component in series with the second motor output and includes a second torque-biasing elastic element. The motor outputs are connected to a common output coupling, and the first and second intermediate mechanical components may include torque-biasing elastic elements that impart a directed pre-load torque to the associated motor output. The motors may be aligned along a common axis or may be coupled to their respective intermediate mechanical components in such a manner as to arbitrarily align each motor axis. In general, the intermediate components include or are coupled to respective gearboxes. The outputs of the intermediate mechanical components are connected via couplings in parallel to the common output that comprises the load. Furthermore, the intermediate components may also be connected to the motor output via couplings such as belts or cables. If desired, the motor shafts may be synchronized, resulting in the mechanical equivalent of a single motor. In general, any mechanical coupling between the motor and the output may introduce backlash, hysteresis, and/or dead-zone. These couplings may result in different forms of backlash, hysteresis, or dead-zone between each of the assemblies.

The system may include a sensor for detecting the position or displacement between the first and/or second intermediate mechanical component. The sensor may be, for example, a Hall Effect sensor used to implement a non-contact displacement sensor for measuring the deflection of the elastic element and thus can be used to determine the output torque of a single intermediate mechanical component. In some embodiments, each of the motors is configured for torque in a single direction and to avoid a zero-torque output where the output bias of each motor is operatively caused by the motor itself. The system may also include means for maintaining a common offset torque between the first and second motors. The motors may also use a position sensor attached to the motor shaft to provide a feedback signal for position based control that synchronizes the motion of the motors to maintain an initial torque bias through the elastic elements. Other displacement sensors include potentiometers, infrared proximity sensors, optical encoders, LVDS sensors, laser distance sensors (single-point version of LIDAR, radar, or sonar, etc.), and capacitive distance sensors.

The sensors may introduce system dead-zone and/or hysteresis into the feedback loop of the control system. For example, an analog slider potentiometer may utilize a mechanical wiper across a resistive element. When the wiper physically changes direction, backlash due to compliance in the physical system may manifest as hysteresis in the sensor measurement.

In general, in another aspect, embodiments of the invention feature a method for reducing backlash in an apparatus with a member geared for rotation in first and second opposite directions by first and second motors. The method includes independently biasing the output of the first motor to preclude space between mating gear components in the first direction and independently biasing the output of the second motor to preclude space between mating gear components in the second direction. The system is able to eliminate output backlash even when one of the intermediate components is within its backlash region as long as the output torque is maintained by the motor that is not within its backlash region. The invention thus provides methods for mitigating system imperfections or non-linearities, such as backlash, hysteresis, and dead-zone by applying an antagonistic force or torque biasing of intermediate system components (e.g., a sensor or an actuator) and/or heterogeneous system components.

In one embodiment, the method includes limiting total torque output to less than maximum output of either the first or the second motor. The method may also include maintaining a constant offset between torques delivered by each motor and allowing the gear components to enter and cross over their backlash region at a first threshold torque value. In some embodiments, the method includes holding one of the motors steady at a second threshold value while continuing to apply torque with the other motor and simultaneously applying torque with the first and second motors beyond the second threshold value.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations, even if not made explicit herein.

BRIEF DESCRIPTION OF THE FIGURES

Other features and advantages of the present invention, as well as the invention itself, can be more fully understood from the following description of the various embodiments, when read together with the accompanying drawings, in which.

DETAILED DESCRIPTION

Figure 1:
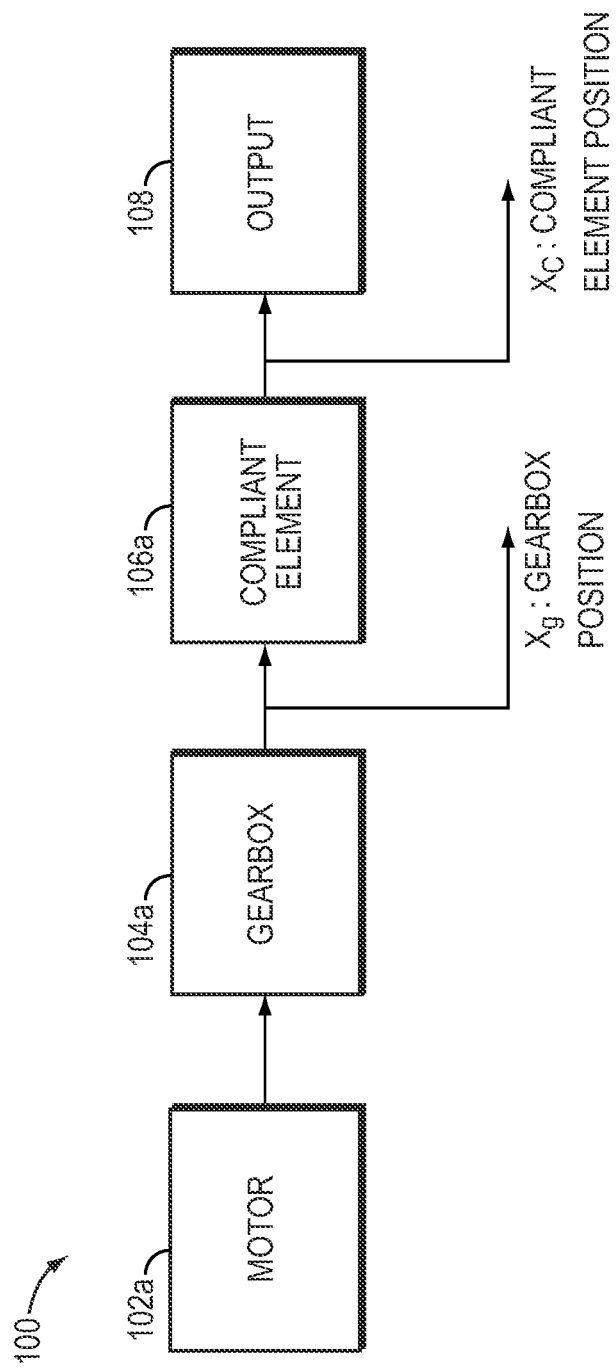
FIG. 1 schematically illustrates, in a block diagram, one actuator of a dual-actuator system for reducing backlash in accordance with one embodiment of the invention.

Generally, embodiments of the present invention reduce or minimize backlash by utilizing elastic elements to bias two separate intermediate mechanical outputs, which are driven by two separate mechanical inputs. Backlash may be defined as entry of a geared interface into an equilibrium band, which corresponds to the range of positions representing a zero torque output (i.e., the gear teeth are not in contact or out of mesh). Refer first to FIG. 1, which, for simplicity of illustration, conceptually depicts the components of a single actuator 100 with an input and an output and equipped, in accordance with an embodiment of the invention, to reduce backlash. The mechanical components corresponding to the blocks of FIG. 1 are illustrated in FIGS. 3 and 4, and FIG. 2 illustrates a complete dual-actuator system.

The actuator 100 includes a first motor 102a, a first gearbox 104a, a first compliant element (or intermediate mechanical component) 106a, and an output 108 coupled in series. A gearbox position $x_g$ and a compliant element position $x_c$ are tracked, such that the difference between the two can be used to determine the position of the intermediate mechanical component or the deflection of an elastic element. The actuator 100 also includes an additional motor, gearbox, and compliant element coupled in the same configuration mirrored about the output 108.

Figure 2:
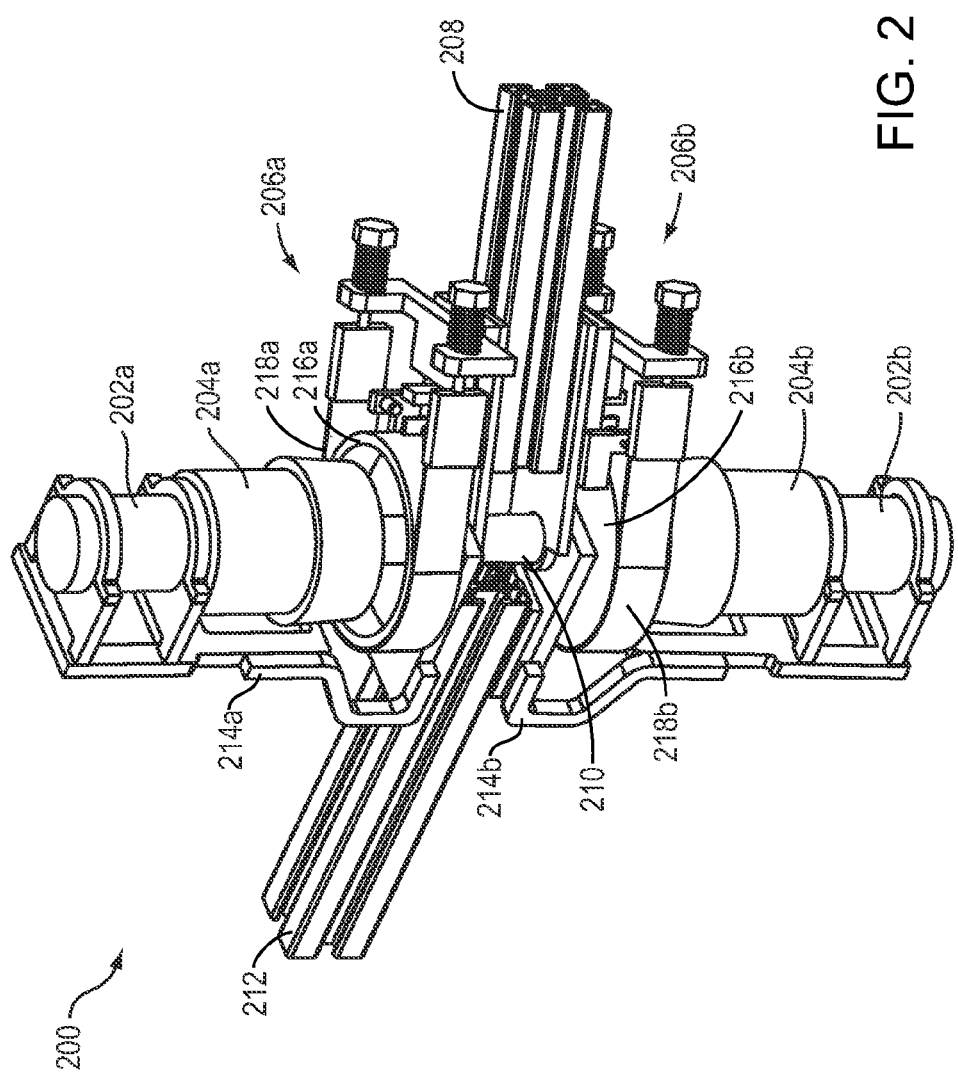
FIG. 2 schematically illustrates, in isometric view, a system for reducing backlash in accordance with one embodiment of the invention.
Figure 3:
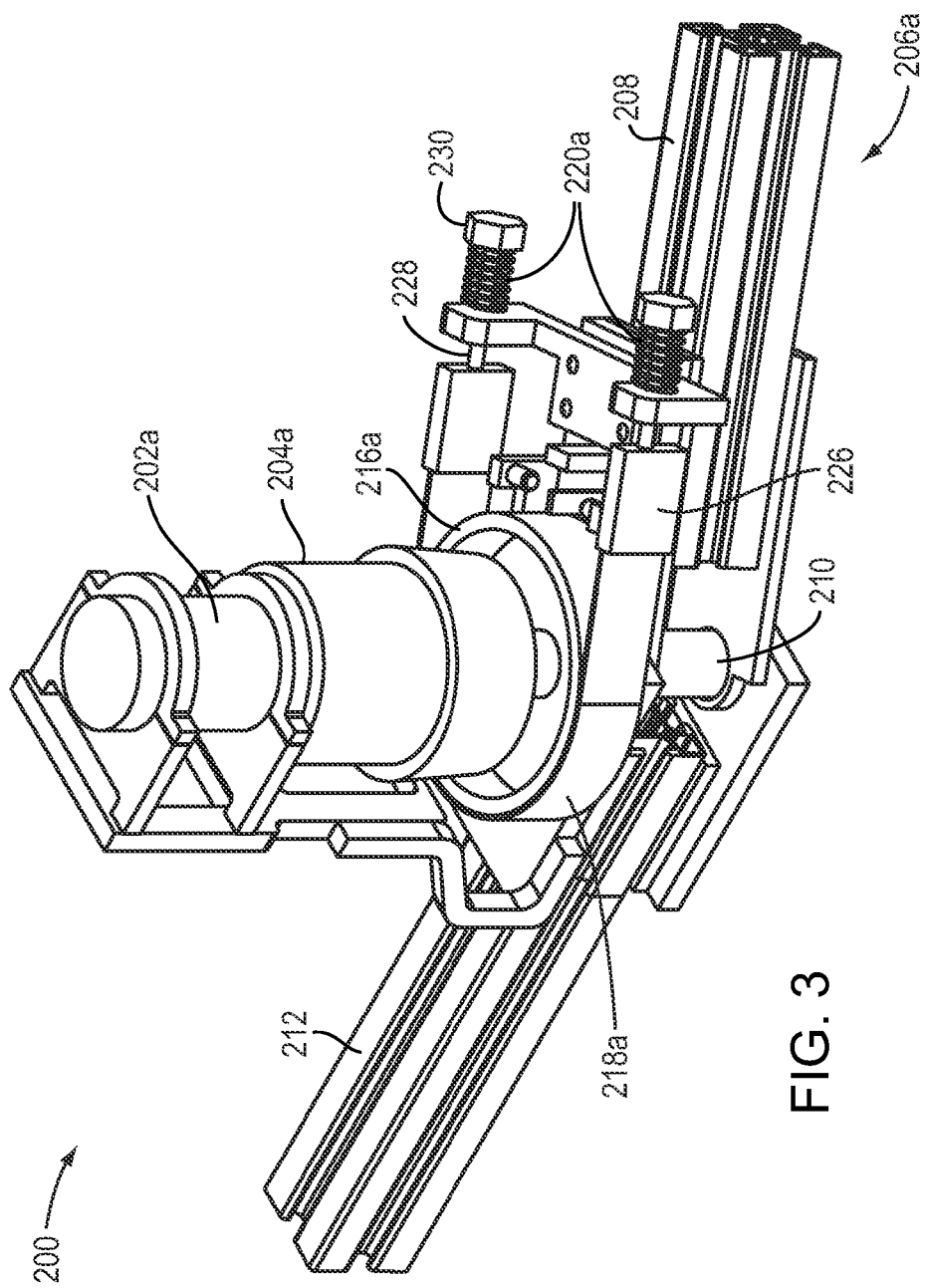
FIG. 3 schematically illustrates, in isometric view, an upper portion (i.e., one actuator) of the system illustrated in FIG. 2.
Figure 4:
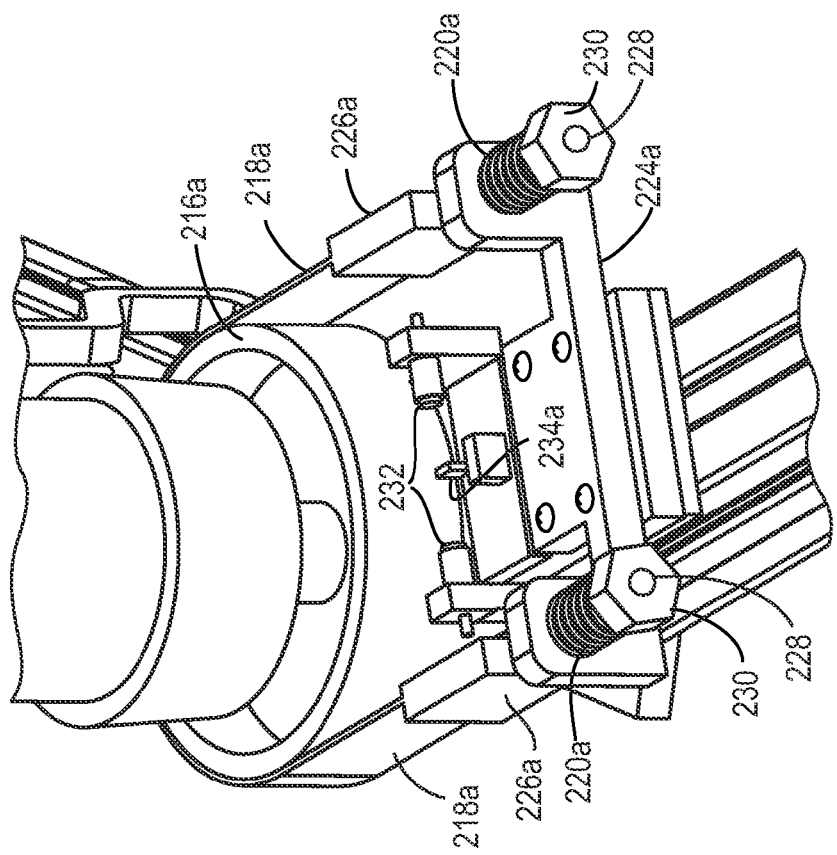
FIG. 4 schematically illustrates, in isometric view, an enlarged area of the upper actuator illustrated in FIG. 3.

With reference to FIGS. 2-4, a system 200 for reducing backlash includes two motors 202a, 202b, two gearboxes, 204a, 204b, two intermediate mechanical components 206a, 206b, and an output mechanical coupling 208. The system 200 also includes a mechanical coupling 210 such as a joint (restricted to rotate around a line such that both the input and output mechanical couplings remain in a plane so as to implement a single degree of freedom), that provides a common axis for many of the components. Also pictured is an input mechanical coupling 212, which the output mechanical coupling 208 moves about a rotational joint having single free rotational axis of freedom. The input mechanical coupling 212 may be coupled to the system 200 via a pair of mounting brackets 214a, 214b.

The motors 202a, 202b are each independently operable in two directions and controllable by a control system. Using two motors allows for the implementation of several torque-offset profiles, as described in greater detail below in connection with FIGS. 5-8. The control system may control position or impedance with a cascaded control, whereby the chosen variable specifies the desired output torque based on the chosen torque-offset profile. The motors 202a, 202b may be disposed at opposite ends of the mechanical coupling 210, thus aligning them along a common axis. Each motor 202a, 202b is coupled to the associated gearbox 204a, 204b, respectively, and these may also be aligned along the mechanical coupling 210. Each gearbox 204a, 204b is configured to transfer motion from the associated motor 202a, 202b to associated motor outputs 216a, 216b. The gearboxes 204a, 204b and the motor outputs 216a, 216b are coupled via mating gear components (e.g., teeth on a gear). In the embodiment depicted in FIGS. 2-4, the associated motor outputs 216a, 216b are disks centered on the mechanical coupling 210, and thus aligned with the motors 202a, 202b and the gearboxes 204a, 204b. Each motor output 216a, 216b is coupled to the associated intermediate mechanical component 206a, 206b; these are described in detail below.

With reference to FIG. 4, it is to be understood that all components described with respect to the first intermediate mechanical component 206a have identical equivalents on the second intermediate mechanical component 206b. The intermediate mechanical component 206a includes a belt 218a, a pair of torque-biasing elastic elements 220a, a sensor 222a, and an output mount 224a. The belt 218a frictionally engages the torque-biasing elastic elements 220a, thereby coupling the motor output 216a to the elastic elements 220a via the belt mounts 226a. The motor output 216a may be aligned along a common axis with the input of the elastic element 220a. The belt 218a may be made of any material that is sufficiently flexible to conform to a surface of the motor output 216a and sufficiently rigid to avoid stretching when tensile forces are applied, such as steel or certain polymers.

The belt mounts 226a each have a protrusion 228 extending from a surface thereof and through complementary bores on the output mount 224a. The bores are tightly dimensioned to allow for smooth sliding contact with the protrusions 228. The protrusions 228 bias the springs such that when the protrusion 228a compresses its associated spring, the protrusion 228b will equally extend the other spring (since they are coupled through the band 218a), resulting in a net torque applied through the output mount 224a—thereby thus biasing the output mount to move.

The elastic elements 220a may be linear springs with identical spring constants that are disposed around the protrusions 228 and held between a surface of the output mount 224a and sealing elements 230 (e.g., nuts) rigidly attached to an end of the protrusions 228. A bottom surface of the output mount 224a is rigidly connected to the output 208, such that any motion of the output mount 224a is transferred to the output 208 and vice-versa.

The sensor 222a detects the position of the intermediate mechanical component 206a (and thus the deflection of the elastic elements 220a). In one embodiment, the sensor 222a includes magnets 232 mounted on the motor output 216a and a Hall effect sensor 234a mounted on the output mount 224a. In this arrangement, as the intermediate mechanical component 206a moves relative to the output mount 224a, the magnetic field experienced by the Hall effect sensor 234a changes because of the change in proximity to the magnets 232. A control system may receive the output of the Hall effect sensor 234a to convert a measurement into a position or deflection reading, that given the spring constants that relate deflection to force, can be used to determine the net output torque applied to 208.

Figure 5:
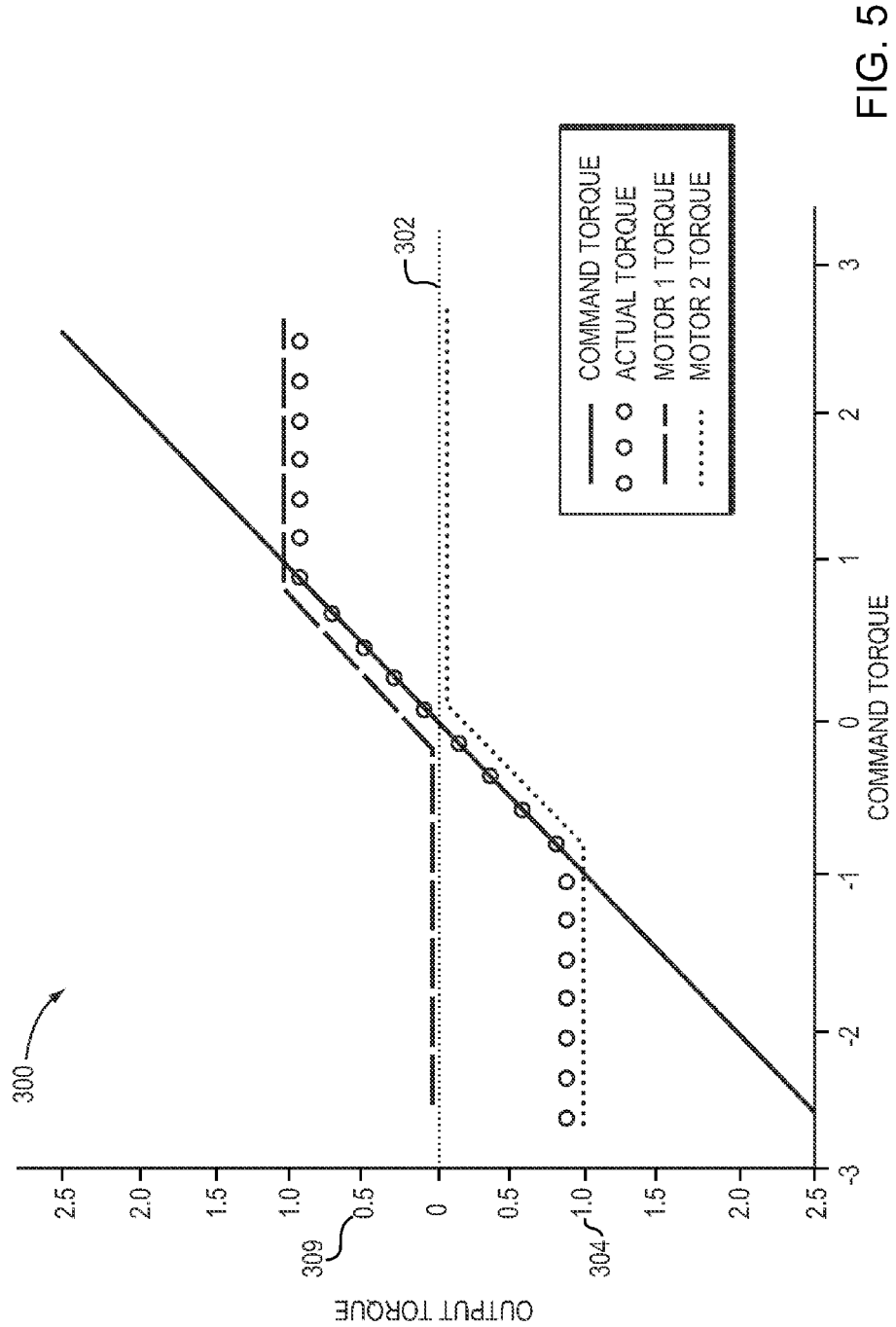
FIG. 5 is a graph illustrating a torque-offset profile of a system for reducing backlash in accordance with one embodiment of the invention where no motors reach zero torque output (enter into their backlash region)

As previously mentioned, the system 200 may be operated to produce a variety of torque-offset profiles because two separate and individually controllable motors 202a, 202b are used. In one torque profile 300, the first motor 202a and the second motor 202b are always applying torque in opposite directions (i.e., one always produces a positive and the other always produces a negative torque) and are configured such that neither motor 202a, 202b ever reaches zero output torque 302, as illustrated in FIG. 5. Additionally, the total torque output of the system 200 may be limited to less than the maximum output 304 of either motor 202a, 202b. When a desired command torque is in the direction of the first motor's 202a operation (e.g., a first direction), the first motor 202a is run at a higher torque than the second motor 202b. In this situation, the first motor 202a is considered the active motor because it drives an intermediate mechanical output in the direction of the command torque, whereas the second motor 202b is considered the resistive motor because it drives an intermediate mechanical output in the direction opposite the command torque. As the motor 202a drives the first gearbox 204a and the first motor output 216a in the first direction, the belt 218a is rotated and equally compresses one of the elastic elements 220a and extends the other elastic element 220a. As a result, the elastic elements 220a create a pre-load torque opposing the torque in the first direction, biasing the motor output 216a against the torque in the first direction to preclude space between mating gear components connecting the gearbox 204a and the motor output 216a in the first direction. Similarly, as the second motor 202b drives the gearbox 204b and the motor output 216b in a second direction, the belt 218b is rotated and equally compresses one of the elastic elements 220b and extends the other elastic element 220b, so that the elastic elements 220b create a pre-load torque opposing the torque in the second direction—biasing the motor output 216b against the torque in the second direction to preclude space between mating gear components connecting the gearbox 204b and the motor output 216b in the second direction. Because the first motor 202a is run at a greater torque than the second motor 202b, the output 208 will rotate in the first direction assuming no external loads at the output. The movement of the motor outputs 216a, 216b moves the magnets 232a, 232b, varying the magnetic fields on the Hall effect sensors 234a, 234b, which can provide values to a control system to calculate the position of the motor outputs 216a, 216b or the deflection of the elastic elements 220a, 220b. The relationship between output torque and measured displacement is non-linear. Such non-linearities can be exploited (by mechanical choices in the sensor design and/or mounting, for example) in order to concentrate sensor resolution in the region of low output torque. This higher resolution may improve controllability or control performance near the backlash region.

To move the output 208 in the second direction, the second motor 202b is driven at a greater torque than the first motor 202a. The process above is essentially repeated, though the second motor 202b is now the active motor and the first motor 202a is the resistive motor. When switching from the first direction to the second direction, there is no backlash because the mating gear components connecting the gear box 204b and the motor output 216b are already pre-loaded in the second direction by the elastic elements 220b.

Figure 6:
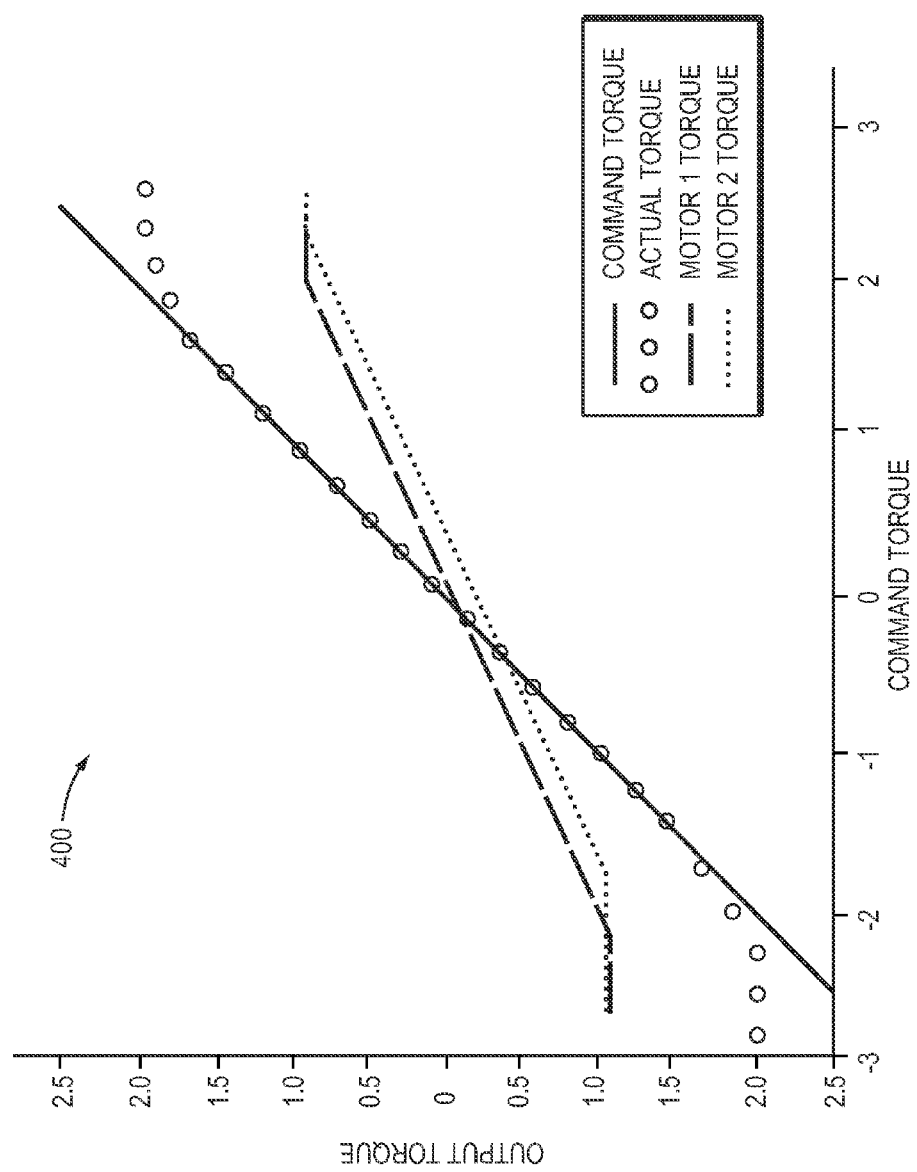
FIG. 6 is a graph illustrating a torque-offset profile of a system for reducing backlash in accordance with one embodiment of the invention where a constant torque offset is maintained between motors.

Another torque-offset profile 400, where the motors 202a, 202b maintain a constant torque output offset, is illustrated in FIG. 6. The torque output offset may be maintained by a conventional control system controlling the operation of the motors 202a, 202b. The motors 202a, 202b may cross over (i.e., change direction) to apply torque in a different direction. This can result in both motors 202a, 202b applying torque in the same direction, which increases the total torque that may be applied as compared to the previous torque-offset profile. This is ideal when the output torque is not likely to be required to quickly shift to the opposite direction. However, the crossover events may occur frequently depending on the command torque, potentially introducing backlash from within the motors 202a, 202b to the system 200. The frequency of the crossover events may be reduced by increasing the amount of torque offset or through means that evaluate the external load to indicate when the external load is likely to cause crossovers and choosing to follow a profile such as 300 that does not have the potential for both motors to be in their backlash region at the same time.

Figure 7:
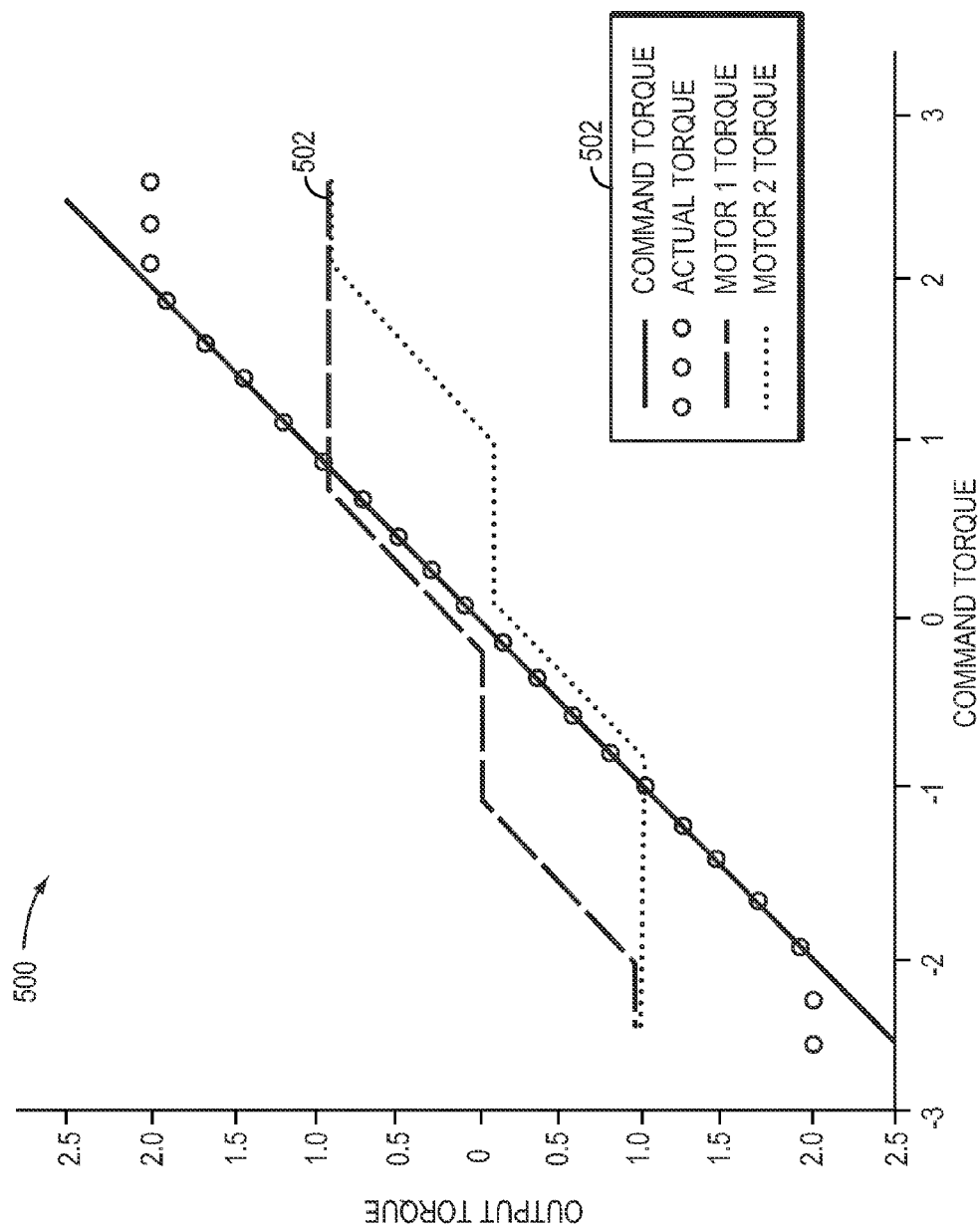
FIG. 7 is a graph illustrating a torque-offset profile of a system for reducing backlash in accordance with one embodiment of the invention where a motor crosses over at the second motor's saturation point.

Yet another torque-offset profile 500, illustrated in FIG. 7, is a combination of the previous two profiles 300, 400. The resistive motor follows the profile 300 (i.e., not crossing over) until the active motor reaches a first threshold value 502 (which may be a saturation point where the active motor is outputting a maximum torque), at which point the resistive motor follows the profile 400 (i.e., crossing over).

Figure 8:
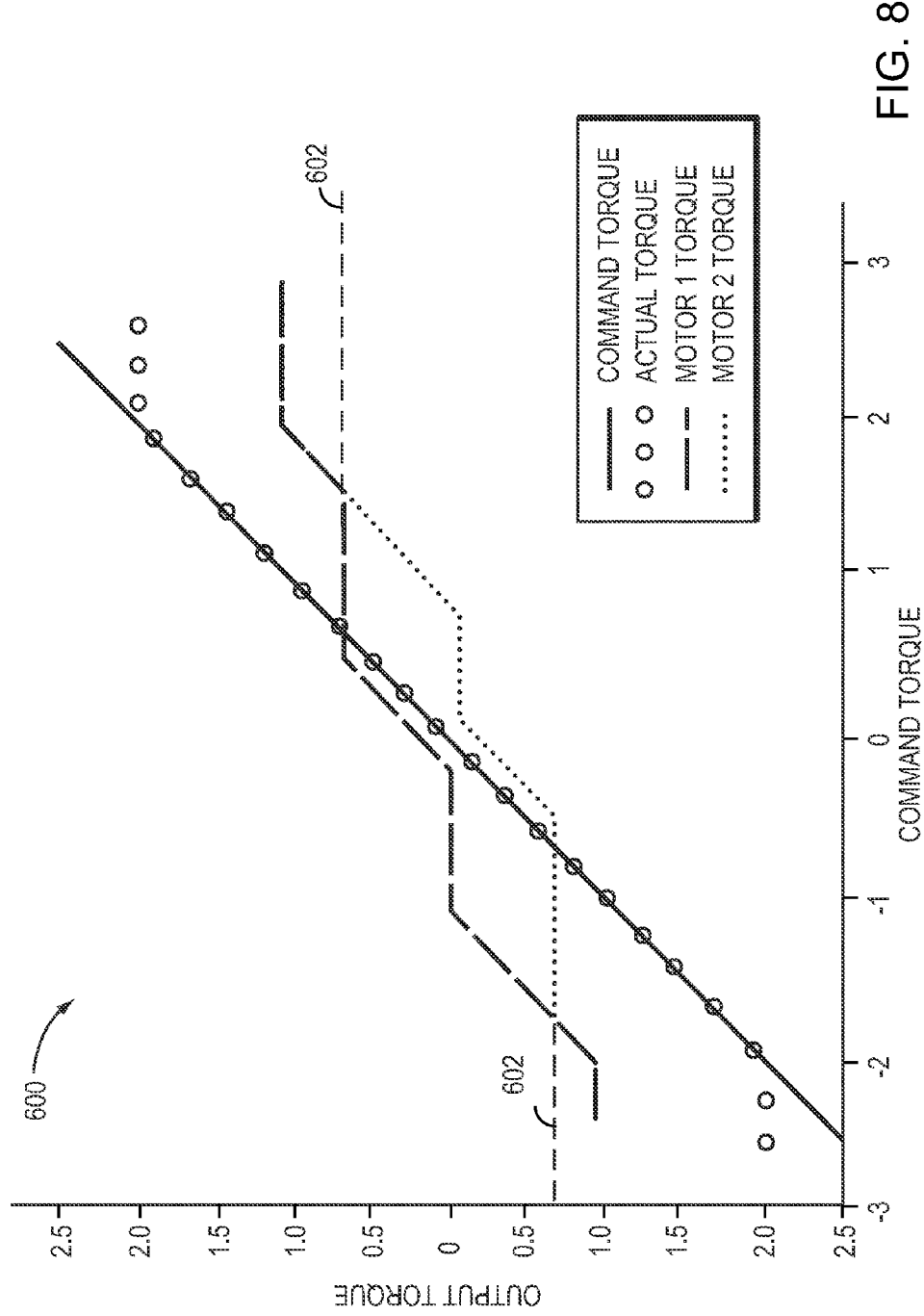
FIG. 8 is a graph illustrating a torque-offset profile of a system for reducing backlash in accordance with one embodiment of the invention where a motor crosses over before the second motor's saturation point.

A further torque-offset profile 600, illustrated in FIG. 8, is similar to the profile 500. When the active motor reaches a second threshold value 602 (which may be before a saturation point), the active motor is held at the second threshold value 602 as the resistive motor crosses over and continues applying torque until it reaches the second threshold value 602. Both motors are driven simultaneously beyond the second threshold value to apply torque up to a saturation point.

Figure 9:
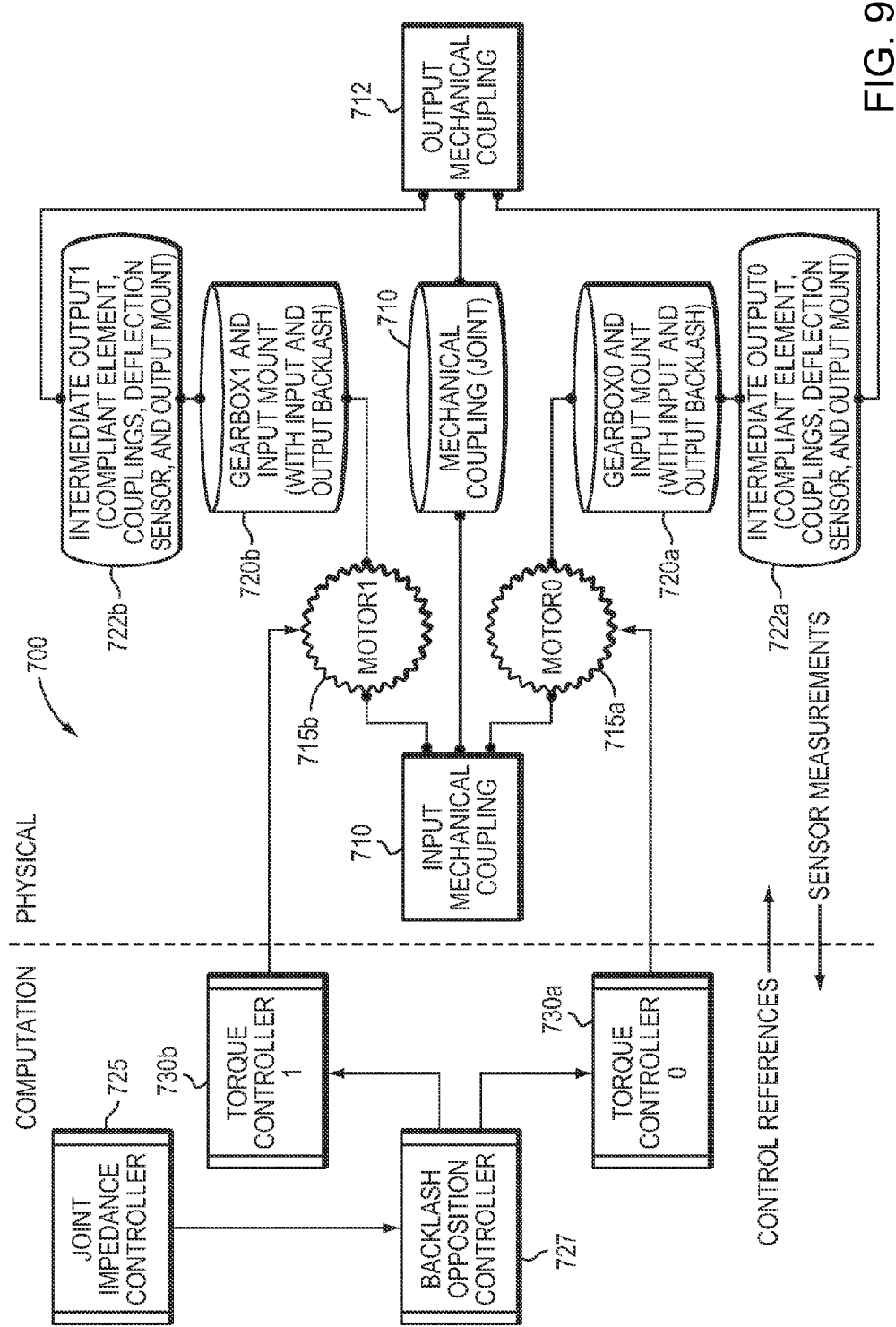
FIG. 9 schematically illustrates, in a block diagram, a model of a system for reducing backlash in accordance with one embodiment of the invention.

FIG. 9 schematically illustrates a hardware model 700 of the system embodiment 200. The model 700 includes connections to a previous link (i.e., an input mechanical coupling 710) and to a subsequent link body (i.e., an output mechanical coupling 712). Each of the motors 715a, 715b acts independently to reduce the backlash at the gearboxes 725a, 725b. The motors 715a, 715b are treated as physically attached to the previous link 710, while the gearboxes 725a, 725b transfer the torque to the subsequent link 712 through the intermediate outputs 730a, 730b (which may be, for example, belts, cables, chains, a drive shaft, hydraulic couplings, etc.).

The control blocks 725, 727, 730a, and 730b form a cascaded control system that provides the motors 715 with reference signals that are used to drive the motor's output. The torque controllers 730a, 730b use feedback from the deflection sensor and provide closed-loop control, whereby the outputs of the motors 715a, 715b are controlled to track the desired torque input to the torque controllers 730a, 730b respectively, from the backlash opposition controller 727. In some embodiments, the torque controllers 730a, 730b utilize standard proportional integral derivative (PID) linear feedback control with a single input (desired total torque) and single output (motor drive reference signal) is employed. Other techniques suitable for implementing closed-loop control within the torque controllers 730a, 730b include optimal control, robust control, and adaptive control.

The backlash opposition controller 727 implements the torque offset profiles shown in FIGS. 5, 6, 7, and 8. In other words, the backlash opposition controller 727 takes a total torque command as input from the joint impedance controller 725 and generates torque inputs to each of the torque controllers 730a, 730b. The joint impedance controller 725 utilizes a control input such as desired joint angle or desired joint impedance (stiffness and damping) to generate a single control output (desired total torque). In some embodiments, the joint impedance controller 725 utilizes proportional derivative (PD) linear feedback control with a single input (desired joint angle) and single output (desired total torque). In this case, desired stiffness and damping are analogous to setting the proportional and derivative gains of the control loop, respectively. Other conventional techniques suitable for implementing closed loop control within 725 are also known in the art.

Typically, when coupling two stiff gear motors in parallel to provide direct opposition to eliminate backlash, binding or significant loss in overall gearbox efficiency occurs. Moreover, the efficiency loss may not be smooth over time and thus can manifest as "torque ripple" or binding.

One solution is to constrain the maximum torque of the motor so as to avoid exceeding the rated loads of the gearbox. To effectively implement suitable active constraints in control, high bandwidth motor torque or current control is usually required.

Large gear reductions result in limited back-drivability due to friction. Non-backdrivable gearboxes can still experience large torques due to environmental interactions. The use of elastic elements further reduces the negative effects of driving both mechanical outputs to the point of overload where the intermediate outputs become stationary, blocking the motor outputs from affecting the intermediate outputs, as if they were jammed. In this case, the motors no longer contribute to the transfer function between the mechanical load and the stages in the gearbox in series up to the point where the gear tooth mesh are within a static friction regime.

A mechanical solution is possible by introducing elastic elements in series with the motor, gear reduction, and load. This arrangement effectively filters impact forces and helps to reduce binding, dynamic frictional losses between gears, and gear tooth wear.

The series elastic implementation alters the impedance of the system and acts as a low pass filter for torque disturbances in addition to delivering protection to the gearbox from large forces (such as those during large accelerations of the external load). The intrinsic impedance of the coupling between the motors and the load is related to the passive impedance of the elastic elements. The control system exploits the intrinsic physical properties of the dual-motor SEA coupling. This forms a hybrid design, incorporating the dynamics of the physical system with a control aspect that provides several different operational modes and from the fact that many different positions of the motors can result in identical output torques.

In any of the profiles 300, 400, 500, 600, by superimposing the torque outputs of the motors and sufficiently biasing them, the equilibrium bands of the subsystems (i.e., the motors) do not overlap. However, even in the dual-motor configuration, it is theoretically possible to experience the effects of backlash. The boundary of the backlash event is defined as when the torque delivered from either motor to the motor output approaches zero. This can happen when an external torque is large enough to accelerate the joint at a rate or to a velocity beyond the rate or velocity of the no-load speed at which the motor applying torque in the same direction can accelerate its associated gearbox. Inadequate sensing of torque can also cause a backlash event by reporting a non-zero torque when the gearbox is indeed applying zero torque.

To mitigate the risk of experiencing a backlash event in the dual motor configuration, a minimum and opposing torque level can be commanded to each of the motors. However, arbitrarily large opposing torque levels may reduce the efficiency of the system, reduce the dynamic range of force sensing, and increase friction and wear. Switching between torque profiles in response to environmental context or control performance can also help to mitigate this risk.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive. Furthermore, the configurations described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A system for reducing backlash in an apparatus having a member geared for rotation in first and second opposite directions, the system comprising:

a first motor mechanically coupled to a first gear box for transferring motion from the first motor output via the gear box;

a first biasing component mechanically coupled to the first motor output for causing rotation in the first direction whereby the first output is biased to preclude space between mating gear components in the first direction;

a second motor, controllable independently of the first motor, mechanically coupled to a second gear box for transferring motion from the second motor to a second motor output;

a second biasing component mechanically coupled to the second motor output for causing rotation in the second direction whereby the second output is biased to preclude space between mating gear components in the second direction; and a coupling system for coupling the first and second outputs to the motor, wherein the first and second motor outputs are in parallel and the first and second biasing components are in series with the two parallel motor outputs for generating opposite torques to prevent backlash.

2. The system of claim 1 wherein the first biasing component is a first intermediate mechanical component in series with the first-motor output and comprising a first elastic element, and the second biasing component is a second intermediate mechanical component in series with the second-motor output and comprising a second elastic element, the first and second intermediate mechanical components being mechanically independent of each other.

3. The system of claim 2 wherein the first and second intermediate mechanical components further comprise at least one of a belt, cable, or transmission for coupling motion from the first and second-motor outputs to the first and second torque-biasing elastic elements.

4. The system of claim 2 wherein the first and second elastic elements each comprise a pair of springs cooperating to impart a commonly directed pre-load torque to the respective motor output.

5. The system of claim 2 further comprising a sensor for detecting a position of at least one of the first intermediate mechanical component and the second intermediate mechanical component.

6. The system of claim 5 wherein the sensor comprises at least one of a Hall Effect sensor, a laser distance sensor, infrared distance sensors, capacitive distance sensor, a potentiometer, or an LVDS sensor.

7. The system of claim 1 wherein each of the motors is configured for rotation in a single direction and to avoid a zero-torque output whereby the output bias of each motor is operatively caused by the motor itself.

8. The system of claim 1 wherein the motors are aligned along a common axis.

9. The system of claim 2 wherein the motor outputs and inputs of the elastic elements are aligned along a common axis whereas the two motors are not aligned.

10. The system of claim 1 further comprising means for maintaining a common offset torque between the first and second motors.

11. A method for reducing backlash in an apparatus having a member geared for rotation in first and second opposite directions by first and second motors each mechanically coupled to a gear box for transferring motion from the motor to a motor output, each motor having an output, the method comprising the steps of:

causing a first biasing component to apply a first torque to the first motor output so as to independently bias the first motor output to preclude space between mating gear components in the first direction;

causing a second biasing component to apply a second torque to the second motor output so as to independently bias the second motor output to preclude space between mating gear components in the second direction; and coupling the output of the first motor and the output of the second motor to the member, wherein the first and second motor outputs are in parallel and the first and second biasing components are in series with the two parallel motor outputs for generating opposite torques to prevent backlash.

12. The method of claim 10 further comprising limiting, by a control system, total torque output to less than maximum output of either the first or the second motor.

13. The method of claim 10 further comprising maintaining, by a control system, a constant offset between torques delivered by each of the first and second motor.

14. The method of claim 10 further comprising using a control system to cross over one of the first and second motors at a first threshold value.

15. The method of claim 10 further comprising using a control system to hold one of the first and second motors steady at a second threshold value while continuing to apply torque with the other of the first and second motors.

16. The method of claim 14 further comprising simultaneously applying torque by a control system with the first and second motors beyond the second threshold value.

* * * * *